US005230762A

United States Patent [19]

Horikiri

[11] Patent Number: 5,230,762

[45] Date of Patent: Jul. 27, 1993

[54] METHOD OF PRODUCING A DECORATIVE PLATE

[75] Inventor: Yataro Horikiri, Tokyo, Japan

[73] Assignee: Sakura Hobby Craft Co., Ltd., Tokyo, Japan

[21] Appl. No.: 845,719

[22] Filed: Mar. 4, 1992

[30] Foreign Application Priority Data

Sep. 25, 1991 [JP] Japan ................................ 3-245786

[51] Int. Cl.⁵ ................................ B32B 3/00

[52] U.S. Cl. ................................ 156/250; 156/251; 156/256; 156/268; 156/248; 428/41

[58] Field of Search .............. 156/250, 251, 256, 257, 156/268, 247, 248, 298, 308.1; 428/41

[56] References Cited

U.S. PATENT DOCUMENTS

| | | | |
|---|---|---|---|
| 2,876,575 | 10/1957 | Leika | 156/268 |
| 3,002,309 | 10/1961 | Snyder | 156/268 |
| 3,649,400 | 3/1969 | Sawaki et al. | 156/63 |
| 3,810,812 | 7/1974 | Koenig | 156/268 |
| 3,816,232 | 6/1974 | Meiser | 156/277 |
| 3,860,473 | 1/1975 | Wesen | 156/257 |
| 3,966,532 | 6/1976 | Harasta | 156/257 |
| 3,991,673 | 11/1976 | Coale et al. | 156/248 |
| 4,597,812 | 7/1986 | Hamilton | 156/63 |
| 4,793,884 | 12/1988 | Horikiri | 156/267 |
| 4,919,741 | 4/1990 | Chirhart et al. | 156/248 |
| 4,938,821 | 7/1990 | Soderlund et al. | 156/251 |
| 5,078,670 | 1/1992 | Volkert | 156/248 |

*Primary Examiner*—David A. Simmons
*Assistant Examiner*—M. Dixon
*Attorney, Agent, or Firm*—Keck, Mahin & Cate

[57] ABSTRACT

A method of producing a decorative plate with a three-dimensional configuration. The method includes the steps of preparing a substrate with a release paper on it, cutting the release paper bonded substrate to form slits of a predetermined configuration, preparing an adhesive core by bonding a release paper leaf and cutting the adhesive core into a smaller size relative to the configured formed by the slits, peeling off the release paper and placing the adhesive core on the peeled-off place, peeling off the release paper leaf from the adhesive core and bonding a decorative cloth, thereto cutting the decorative cloth along the predetermined configuration of slits and pushing the peripheral ends of the cloth into the slits.

4 Claims, 6 Drawing Sheets

METHOD OF PRODUCING A DECORATIVE PLATE

BACKGROUND OF THE INVENTION

The present invention relates to a method of producing a decorative plate which can express rich patterns and designs by forming corrugations on a surface of the decorative plate.

There is a traditional method of producing a decorative plate, in which a decorative cloth is cut into a predetermined shape in accordance with a paper pattern, sewed into a bag-shape with one side open and then a core of a thick paper is inserted into the bag-shaped decorative cloth. However, the traditional method requires complex steps and is troublesome.

Japanese Patent Publication No. 63-24839/1988 discloses a method which bonds colored paper to a formed resin sheet having slots, crushes the foamed resin sheet with a spatula, and shapes it into corrugations of a predetermined three-dimensional shape, so that a decorative plate having a three-dimensional shape can be easily produced.

The method disclosed in the Japanese publiction requires that the foamed resin sheet is crushed under a predetermined pressure by the use of the spatula and the like and, therefore, it is quite difficult to form an accurately dimensioned three-dimensional shape. Particularly, there is a problem that a certain level of skill is required to shape very small and complex portions.

SUMMARY OF THE INVENTION

An object of the present, invention is to provide a new method of producing a decorative plate very easily and accurately.

Another object of the preset invention is to provide a new method of producing a decorative plate, with which an amateur can easily produce a decorative plate having a cubic or three-dimensional feeling.

According to the present invention, there is provided a method of producing a decorative plate comprising the steps of:

(1) bonding a release paper 7 to a surface of a substrate 5, (2) forming cuts or slits 9 on the surface of the combined structure of the substrate 5 with the release paper 7 to thereby form a predetermined contour, (3) preparing a release paper 13*c* to a surface of an adhesive core 13 and cutting the adhesive core to a size slightly smaller than a formation portion 1*b* contoured by the slits 9, (4) peeling off the release paper 7 from the formation portion 1*b* to expose an adhesive layer thereon and placing the adhesive core 13 on the adhesive layer of the formation portion 1*b*, (5) peeling off the release paper 13*c* from the adhesive core 13 to expose an adhesive layer thereon and bonding a decorative cloth 17 on the adhesive layer of the adhesive core 13, and (6) cutting the decorative cloth along the contour made by the slits 9 and pushing a peripheral portion of the cut decorative cloth into the slits.

According to another aspect of the invention, there is provided a method of producing a decorative plate comprising the steps of:

(1) bonding a release paper 7 to a surface of a substrate 5, (2) forming slits 9 on the surface of the combined structure of the substrate 5 with the release paper 7 to form a predetermined contour to thereby form a pattern board 1, (3) peeling off the release paper of a formation portion 1*a* of the pattern board 1 contoured by the slits 9 to expose an adhesive layer thereof, (4) placing a first decorative cloth 12 on the adhesive layer of the pattern board 1, (5) cutting the first decorative cloth along the contour made by the slits, (6) pushing a peripheral portion of the cut first decorative cloth into the slits, (7) preparing an adhesive core 13 having a release paper 13*c* thereon and cutting the adhesive core 13 into a size (slightly smaller) than a formation portion 1*b* encompassed by the cut groove 9 of the pattern board, (8) peeling off the release paper at the formation portion to expose an adhesive layer, (9) placing the cut adhesive core on the adhesive layer of formation portion,

(10) peeling off the release paper of the adhesive core 13 to expose an adhesive layer,

(11) placing a second decorative cloth 17 on the adhesive layer of the adhesive core,

(12) cutting the second decorative cloth along the slits encompassing the formation portion 1*b*, and

(13) pushing a peripheral portion of the cut second decorative cloth into the slits.

In the second aspect of the present invention described above, the formation portions 1*a* of a flat surface can be formed by directly bonding the first decorative cloth 12 to the surface of the substrate 5, and three-dimensional formation portions 1*b* can be formed by bonding the second decorative cloth 17 to the surface of the substrate 5 through the adhesive core 13.

PREFERRED EMBODIMENTS OF THE INVENTION

Figure 1:
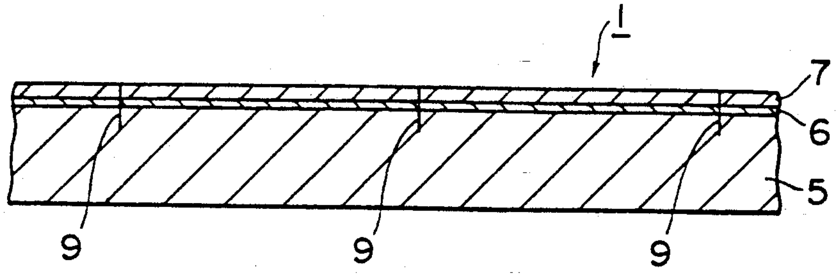
FIG. 1 is a perspective view of a pattern board used for the present invention.
Figure 2:
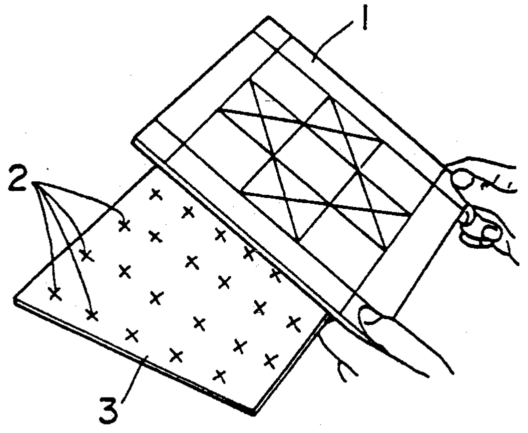
FIG. 2 is a perspective view showing a bonding step of a backing plate to the back of a pattern board.

Referring first to FIGS. 1 and 2, a backing plate 3 is bonded by a bond 2 to the back of a pattern board 1, and then aging is made for a predetermined time (e.g. 2–3 minutes) to cure the bond 2. The pattern board 1 has a three-layer construction having a substrate 5 of a soft foamed resin such as foamed polystyrene with a thickness of about 5–7 mm, and a release paper 7 with an adhesive layer 6 between the substrate 5 and the release paper 7. The pattern board 1 is provided with a predetermined decorative figures or patterns, which will be referred to as a pattern or patterns for simplicity. Cuts or slits 9 are formed extending from a surface of the release paper 7 to 1–2 mm depth of the substrate 5 as shown in FIG. 1.

Figure 3:
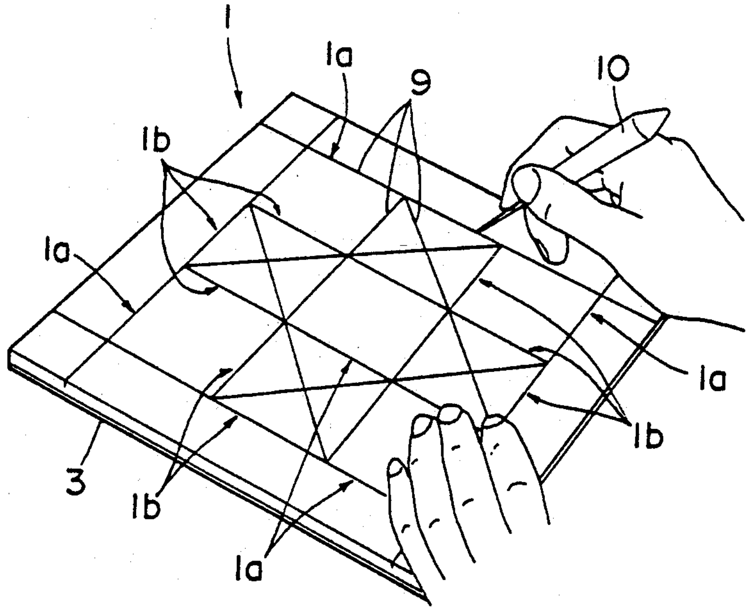
FIG. 3 is a perspective view showing the step of softly tracing the pattern board along cut grooves on the pattern board.
Figure 4:
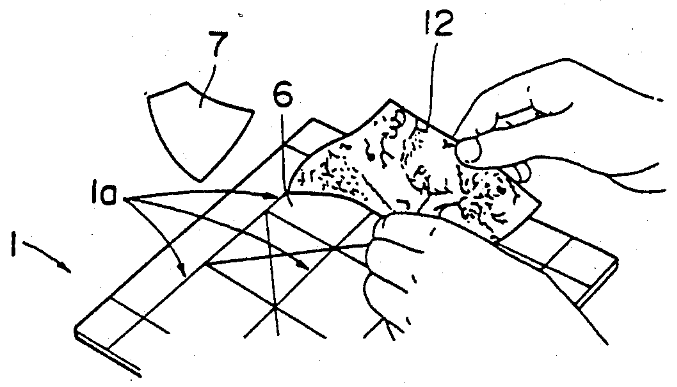
FIG. 4 is a perspective view showing the step of peeling off a release paper from a flat surface formation portion of the pattern board and placing a first decorative cloth on the adhesive surface of the flat surface formation portion.

After the backing plate is bonded to the back of the pattern board 1, the pattern board 1 is softly traced along the slits 9 by an awl 10 so as to identify the position of the slits 9 on the pattern board 1, so shown in FIG. 3. If the position of the slits 9 is clearly identified already, the tracing by the awl 10 is not necessary.

Figure 5:
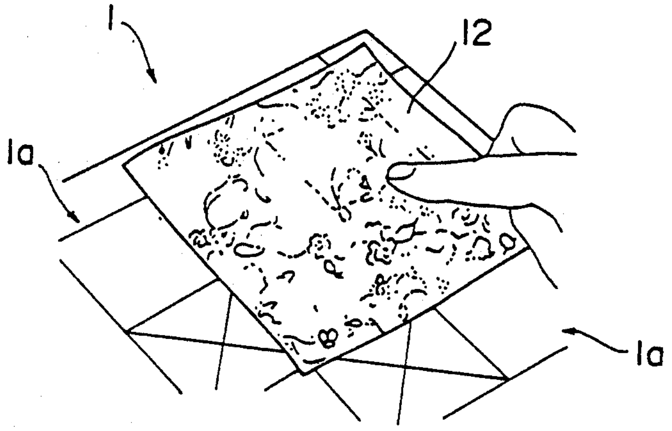
FIG. 5 is a perspective view showing the step of pushing with a finger the first decorative cloth for bonding.
Figure 6:
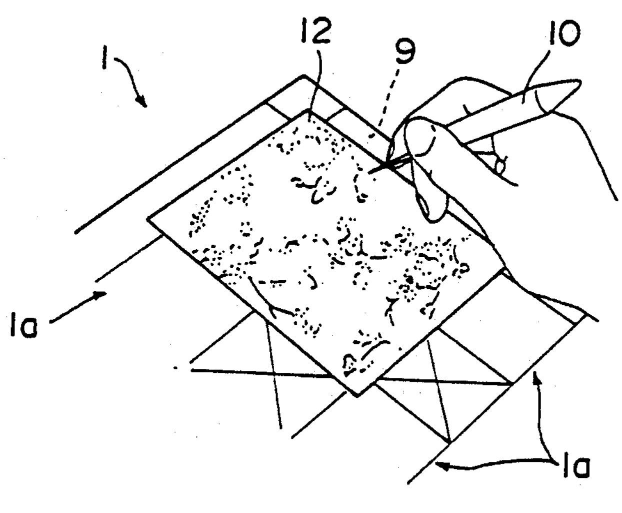
FIG. 6 is a perspective view showing the step of softly tracing the first decorative cloth along the slits by the use of an awl.

In FIGS. 3–6, the pattern board 1 has flat surface formation portions 1*a*, which are square portions illustrated in FIG. 3. One piece of the release paper 7 at the position of one of flat surface formation portions 1*a* is peeled off to expose the adhesive layer 6. A first decorative cloth 12 with a predetermined design is placed on the exposed adhesive layer 6 and adhered thereon with a pressure by a finger as shown in FIG. 5. Then, as shown in FIG. 6, the first decorative cloth 12 is softly traced along the slits 9 by the awl 10. In this case, the first decorative cloth 12 is fixed to the substrate by the adhesive 6 and, accordingly, it is not removed or deviated accidentally from the substrate 5.

Figure 7:
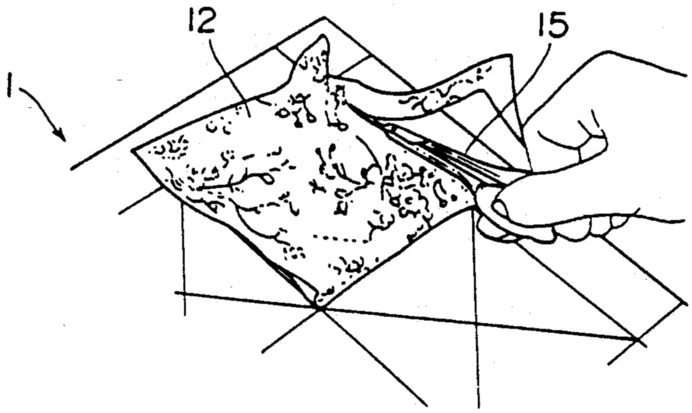
FIG. 7 is a perspective view showing the step of cutting off the first decorative cloth by scissors.
Figure 8:
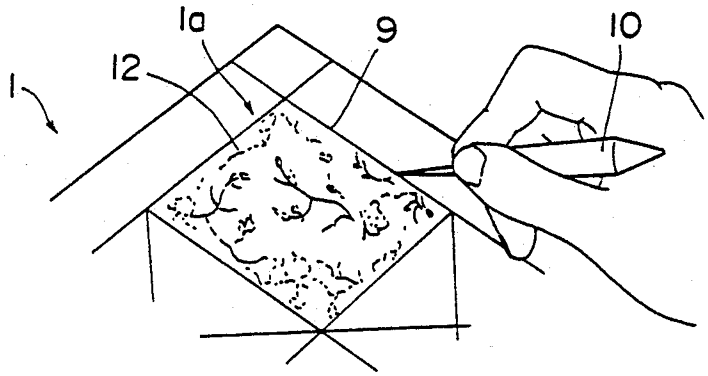
FIG. 8 is a perspective view showing the step of pushing the peripheral portion of the first decorative cloth into the slits of the pattern board.
Figure 9:
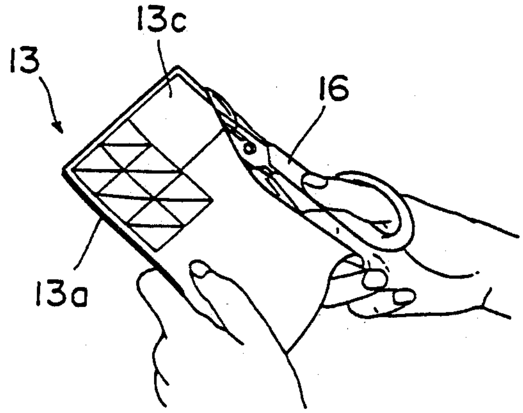
FIG. 9 shows the step of cutting off an adhesive core into a predetermined shape.

Thereafter, as shown in FIGS. 7 and 8, unnecessary portions except a 3 mm-wide periphery are cut away by a cutting tool such as scissors out of the first decorative cloth 12 (FIG. 7), and the peripheral portion of the first decorative cloth 12 is pushed into the slits of the pattern board 1 by the awl 10 (FIG. 8). Thus, a cloth bonding operation of the flat surface formation portions 1*a* is completed. Similarly, the cloth bonding operation for the rest of the flat surface formation portions 1*a* of the pattern board 1 is carried out.

After the cloth bonding operation of all the flat surface formation portions 1*a* of the pattern board 1 is completed in this way, the operation then shifts to a cloth bonding operation of three-dimensional (or three-dimensionally expanded) formation portions 1*b* of the pattern board 1, the three-dimensional formation portions 1*b* being triangular portions in the decorative design in the example of FIG. 3. The cloth bonding operation of the three-dimensional formation portions 1*b* will be described with reference to FIGS. 12–16.

Figure 14:
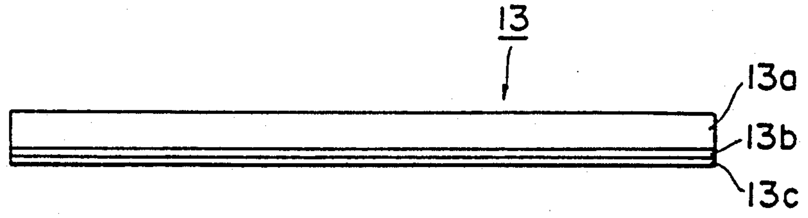
FIG. 14 is a side view of the adhesive core.

Referring first to FIG. 14, an adhesive core 13 is prepared by bonding a release paper leaf 13*c* to the back of a 2 to 3 mm-thick rayon felt 13*a* by an adhesive 13*b*, and this adhesive core 13 is cut off in the shape which is slightly smaller than the shape (triangular shape) of the three-dimensional formation portions 1*b* of the pattern board 1 so that it has a contour smaller by about 0.2 mm, for exmple, than the contour of the three-dimensional formation portion 1*b*. Some methods can be employed for preparation of the shaped adhesive core 13. For example, a predetermined figure, which has a shape slightly smaller than the shape of the three-dimensional formation portion 1*b* of the pattern board 1, is printed on the release paper leaf 13*c* of the adhesive core 13, and this printed adhesive core 13 may be cut out by a pair of scissors. Alternatively, a sheet of paper having a predetermined figure printed thereon is bonded to the release paper leaf 13*c* of the adhesive core 13 and this can be cut off by a pair of scissors. It is also possible to draw a predetermined figure on the release paper leaf 13*c* of the adhesive core 13 by the use of a desired paper pattern, and to cut it by a pair of scissors 16. Still alternatively, the adhesive core 13 may be punched out and taken out by the use of a punch having a predetermined figure.

Figure 10:
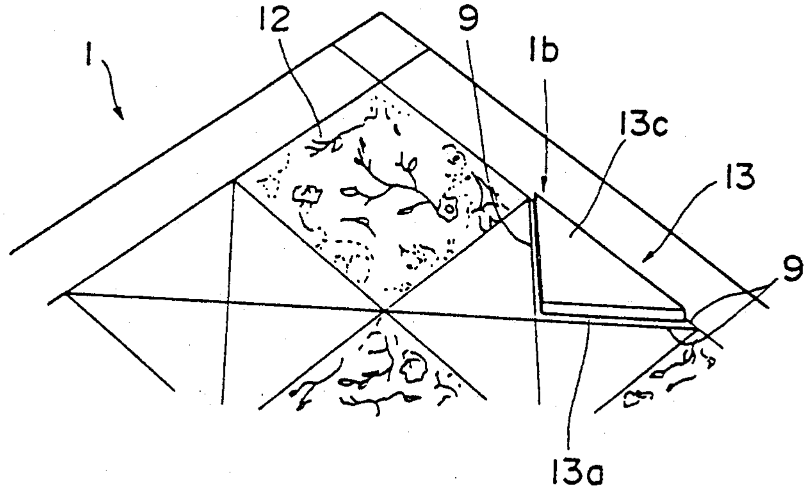
FIG. 10 shows the step of bonding the adhesive core to the adhesive surface of the pattern board.
Figure 11:
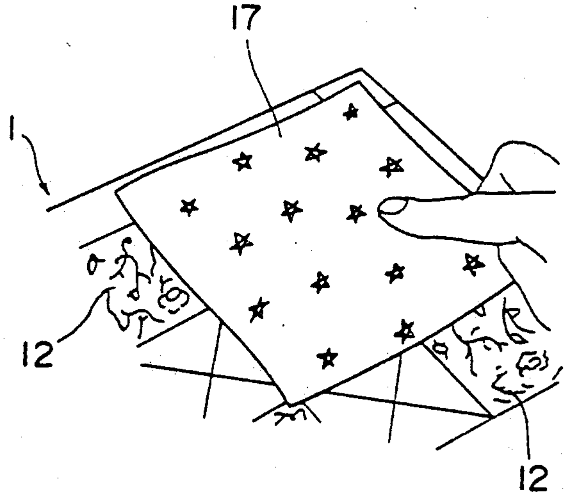
FIG. 11 shows the step of placing a second decorative cloth to the adhesive surface of the adhesive core and pushing it with a finger for bonding.
Figure 12:
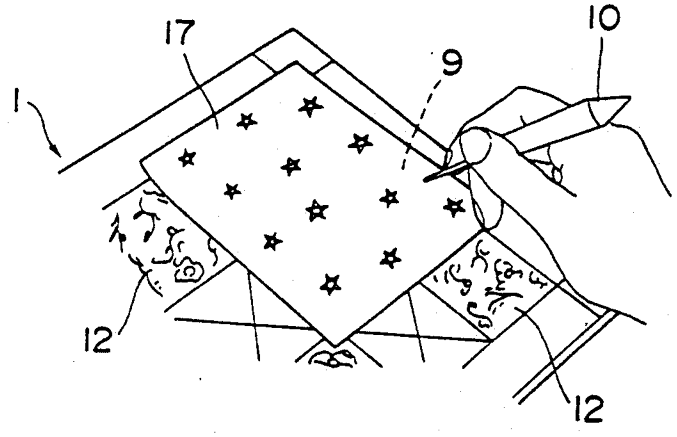
FIG. 12 shows the step of tracing the second decorative cloth along the slits by the awl.
Figure 15:
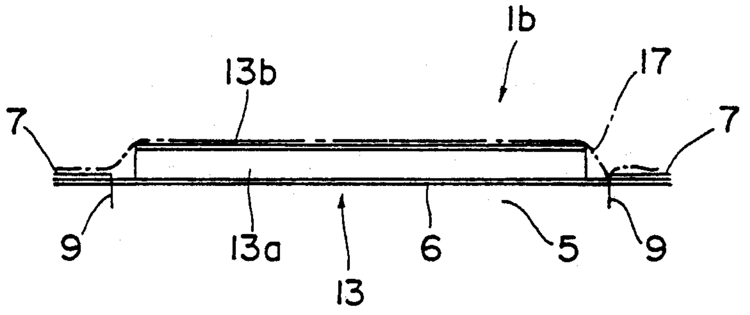
FIG. 15 is a sectional view of the decorative plate in the step of FIG. 12.

After the advesive core material 13 is cut out in the shape a little smaller than the shape of the three-dimensional formation portion 1*b* of the pattern board 1 in the manner described above, one piece of release paper 7 of the three-dimensional formation portion 1*b* of the pattern board 1 is peeled off to expose the adhesive surface 6, and the adhesive core 13 is then bonded through the rayon felt 13*a*, with the peel paper piece 13*c* being positioned up, to the center of the adhesive surface 6 as shown in FIG. 10. Then, the adhesive core 13 is bonded so that it is disposed inside the contour of the three-dimensional formation portion 1*b*, that is, the slits 9, by a distance of about 2 mm. Next, the release paper leaf 13*c* of the adhesive core 13 is peeled to expose the adhesive surface 13*b*, and second decorative cloth 17 having a different design from that of the first decorative cloth 12 is bonded onto the adhesive surface 13*b* as shown in FIG. 11. Then, the second decorative cloth 17 is softly traced with an awl 10 from above along the slits 9 as shown in FIG. 12. In this instance, the second decorative cloth 17 is bonded to the adhesive core 13 through the adhesive 13*b* as shown in FIG. 15 and moreover, the adhesive core 13 is fixed to the substrate 5 through the adhesive 6. Therefore, the second decorative cloth 17 is not removed or deviated from the substrate 5.

Figure 13:
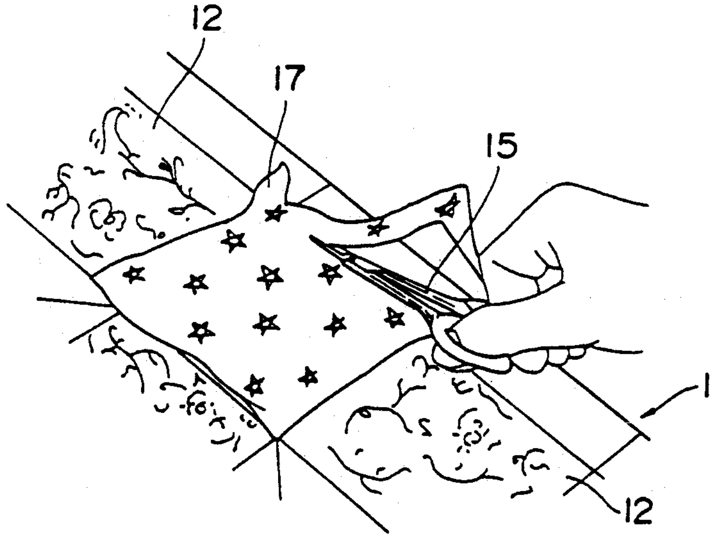
FIG. 13 shows the step of cutting off the second decorative cloth.
Figure 16:
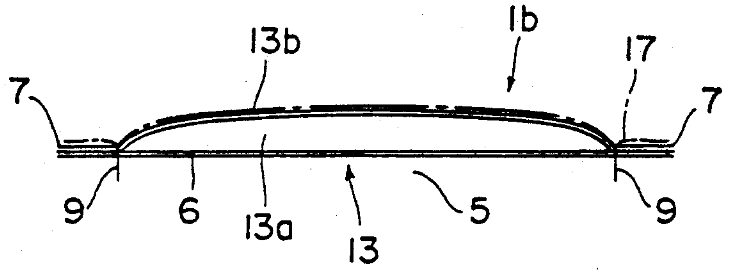
FIG. 16 is a sectional view of the decorative plate in the step of FIG. 13.

After the second decorative cloth 17 is traced from the complete bonding, unnecessary portions except a 3 mm-wide preiphery are cut off by the scissors 15 out of the second decorative cloth 17 as shown in FIG. 13, and the peripheral edge of the second decorative cloth 17 is pushed into the slits 9 of the pattern board 1 by the use of the awl 10. Consequently, the peripheral portion of the adhesive core 13 is compressed downward by a pushing force as shown in FIG. 16, so that the second decorative cloth 17 forms a three dimensional shape whose center portion projects slightly upwardly. In this way, the cloth bonding operation of the three-dimensional formation portion 1*b* is completed. Similarly, the cloth bonding operation is carried out for the rest of the three-dimensional formation portions 1*b* of the pattern board 1.

Thus, the cloth bonding operation for all the three-dimensional formation portions of the pattern board 1 is thus completed, and there is provided a decorative plate having rich expression. Since the backing plate 3 is bonded to the back of the decorative plate that is completed in this way, the decorative plate is reinforced by the backing plate 3 and the decorative property of the back can be improved.

The embodiment described above explains the case where a soft foamed resin, such as foamed polystyrene, is used as the substrate 5 of the pattern board 1, but the substrate 5 is not particularly limited thereto. For example, the substrate 5 made of a rigid foamed resin, a cardboard, a combination of cardboards, a cardboard having a base such as a wood plate bonded to the back thereof, and the like can also be used. The adhesive core 13 in the embodiment is produced by bonding the release paper leaf 13*c* to the back of the rayon felt 13*a* by the adhesive 13*b*, but a cotton-like synthetic fiber, a sponge, or the like, can also be used in place of the rayon felt 13*a*. Decorative plates made of other materials (such as paper, leather, synthetic resin sheet, metal foil, etc.) may be bonded in place of the first and second decorative cloths 12, 17 and by so doing, decorative plates having various textures can be produced, as well.

In the embodiment described above, the cloth bonding operation of the three-dimensional formation portions 1*b* is carried out after the cloth bonding operation of the flat surface formation portions 1*a* of the pattern board 1 is completed. In the present invention, however, the cloth bonding operation of the three-dimensional formation portions 1*b* may of course be carried out before the cloth bonding operation of the flat surface formation portion 1*a*. Furthermore, it is naturally possible to produce a decorative plate having a three-dimensional impression by applying the present invention to a punched board 1 consisting only of the three-dimensional formation portions 1*b*.

As described above, the method according to the first aspect of the present invention involves the steps of bonding the release paper 7 by the adhesive 6 to the surface of the substrate 5, forming the slits 9 each having a predetermined depth into the surfaces of release paper 7 and the substrate 5 in such a manner as to form a suitable pattern, cutting the adhesive core 13 formed by bonding the release paper leaf 13*c* by the adhesive 13*b* to the back of the rayon felt 13*a* or the like into a shape somewhat smaller than the shape of the three-dimensional formation portions 1*b* encompassed by the slits 9, peeling of the release paper 7 of the three-dimensional formation portions 1*b* to expose the surface of the adhesive 6, bonding the cut adhesive core 13 to the center of the exposed adhesive surface 6 through its rayon felt 13, peeling off the release paper leaf 13*c* of the adhesive core 13 to expose the adhesive surface 13, bonding the decorative cloth 17 to the adhesive surface 13*b*, cutting the decorative cloth 17, along the slits 9 encompassing the three-dimensional formation portions 1*b*, and pushing the peripheral portion of the thus cut decorative cloth 17 into the slits 9. Therefore, since the three-dimensional formation portions 1*b* can be finished by merely bonding the decorative cloth 17 onto the surface of the substrate 5 through the adhesive core 13, the decorative plate having a three-dimensional feel can be produced extermely easily by people who are not an expert. Even when the three-dimensional formation portions 1*b* have an elaborate and complicated shape, it is only necessary to cut the adhesive core 13 in accordance with such a shape. Accordingly, a decorative plate having a desired shape can be produced extremely easily.

Furthermore, the method of the second aspect of the present invention comprises the combination of the first cloth bonding operation and the second cloth bonding operation. The first bonding operation involves the steps of bonding the release paper 7 by the adhesive 6 to the surface of the substrate 5, forming the slits 9 each having a predetermined depth into the surfaces of the release paper 7 and substrate 5 so as to form a suitable pattern and to thereby obtain the pattern board 1, peeling off the release paper 7 of the flat surface formation portions 1*a* encompassed by the slits on the pattern board 1 to expose the adhesive surface 6, bonding the first decorative cloth 12 to the adhesive surface 6, cutting the first decorative cloth 12 along the slits 9 encompassing the flat surface formation portions 1*a*, and pushing the peripheral portions of the first decorative cloth 12 thus cut off into the slits 9.

The second cloth bonding operation involves the steps of cutting a adhesive core 13 into the shape slightly smaller than the shape of the three-dimensional formation portions 1*b* encompassed by the slits 9 on the pattern board 1, peeling off the release paper 7 of the three-dimensional formation portions 1*b* to expose the adhesive surface 6, bonding the thus cut adhesive core 13 to the center of the adhesive surface 6 through the rayon felt or the like, peeling off the release paper 13*c* of the adhesive core 13 to expose the adhesive surface 13, bonding the second decorative cloth 17 to the adhesive surface 13*b*, cutting off the second decorative cloth 17 along the slits 9 encompassing the three-dimensional formation portions 1*b*, and pushing the peripheral portion of the thus cut second decorative cloth 17 into the slits. Accordingly, the flat surface formation portions 1*a* can be finished by merely bonding directly the first decorative cloth 12 to the surface of the substrate 5 and the three-dimensional formation portions 1*b* can be finished by merely bonding the second decorative cloth 17 to the surface of the substrate 5 through the adhesive core 13. Therefore, the decorative plate consisting of the flat surface formation portions 1*a* and the three-dimensional formation portions 1*b* to thereby provide a rich expression can be produced extremely easily.

What is claimed is:

1. A method of producing a decorative plate comprising the steps of:

(1) bonding a release paper to a surface of a substrate, (2) forming slits on the surface of the combined structure of the substrate with the release paper to thereby form a portion having a predetermined contour, (3) preparing a release paper leaf for a surface of a three-dimensional adhesive core and cutting a base of the adhesive core to a size slightly smaller than the portion contoured by the slits, (4) peeling off the release paper from the portion outlined by the slits to expose an adhesive layer thereon and placing the base of the adhesive core on the adhesive layer of the portion outlined by the slits, (5) peeling off the release paper leaf from the adhesive core to expose an adhesive layer thereon and bonding a decorative cloth on the adhesive layer of the adhesive core, and (6) cutting the decorative cloth along the contour made by the slits and pushing a peripheral portion of the cut decorative cloth into the slits.

2. A method of producing a decorative plate comprising the steps of:

(1) bonding a release paper to a surface of a substrate,
(2) forming slits on the surface of the combined structure of the substrate with the release paper to form a predetermined contour to thereby form a pattern board,
(3) peeling off the release paper of a formation portion of the pattern board contoured by the slits to expose an adhesive layer thereof,
(4) placing a first decorative cloth on the adhesive layer of the pattern board,
(5) cloth along the contour made by the slits,
(6) pushing a peripheral portion of the cut first decorative cloth into the slits,
(7) preparing an adhesive core having a release paper leaf thereon and cutting the adhesive core into a size slightly smaller than a formation portion encompassed by the cut groove of the pattern board,
(8) peeling off the release paper at the formation portion to expose an adhesive layer,
(9) placing the cut adhesive core on the adhesive layer of the formation portion,
(10) peeling off the release paper leaf of the adhesive core to expose an adhesive layer,
(11) placing a second decorative cloth on the adhesive layer of the adhesive core,
(12) cutting the second decorative cloth along the slits encompassing the formation portion, and
(13) pushing a peripheral portion of the cut second decorative cloth into the slits.

3. The method of producing a decorative plate according to claim 2, wherein said formation portions has a flat surface and is formed by directly bonding said first decorative cloth to a surface of said substrate.

4. The method of producing a decorative plate according to claim 3, wherein a three-dimensional formation portion is formed by bonding said second decorative cloth to the surface of said substrate through said adhesive core.

* * * * *